Patented Mar. 24, 1942

2,277,048

UNITED STATES PATENT OFFICE 2,277,048

THIXOTROPIC COMPOSITION OF MATTER

Martin Leatherman, Hyattsville, Md.; dedicated to the free use of the People in the territory of the United States of America No Drawing. Application October 22, 1940, Serial No. 362,243

2 Claims. (Cl. 252—311)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States of America to take effect on the granting of a patent to me.

The primary object of my invention is to prepare concentrated aqueous emulsions of precipitated resinates which may be easily dispersed in water and which, upon evaporation of the water, will leave adherent films. Such films are particularly desirable in that when used in conjunction with plant sprays, they act to increase the resistance of spray materials to weathering.

I have found that when metallic resinates are blended into certain mixtures they become strongly thixotropic and emulsions containing over 50 percent water assume a high degree of rigidity, which should be an advantage in packaging said emulsions.

My invention is of especial value as a method for preparing copper and zinc resinates for use in spray compositions, wherein it is of particular value as a fungicide. A further merit of the copper resinate emulsion is that it offers a highly insoluble fungicidal copper-containing spray material which does not have the usual excess of lime found in copper sprays, and which is often injurious to plants. The lime which is added to my composition reacts with the ammonium proteinate to expel the ammonia and to precipitate calcium proteinate which is relatively water-insoluble, and shows no tendency to bring about the removal of the copper resinate from foliage.

The high resistance to wetting displayed by finely divided precipitated resinates makes it necessary that these resinates first be prepared in emulsion form if they are to be easily dispersed in water. Another objectionable feature of the precipitated resinates is that in the dry state they possess a very low density and require bulky packaging. When prepared in emulsion form, hereinafter described, the resinates assume a high density, without losing the finely divided state, which is highly desirable. Thus, my invention accomplishes two important objects: first, the resinates become easily dispersible in water, but upon evaporation of the water they resume their original water-repellency; second, they lose their voluminosity, and a much greater quantity can therefore be placed in a package of a given size.

The ingredients used in carrying out my invention are (1) aqueous ammonium proteinate solution; (2) any water-insoluble resinate, or mixture of insoluble resinates, such as those of copper, zinc, silver, calcium, manganese, cobalt and the like; and (3) hydrated lime, or hydrated magnesia. The ratio of ammonium proteinate solution to insoluble resinate is controlled by the thixotropic nature of the composition.

In carrying out my invention, I may employ certain definite steps. First, the ammonium proteinate solution is prepared by dispersing any suitable protein, such as, for example, casein, soybean protein, peanut protein, gelatin, and the like, in a dilute ammonia solution. The ammonia concentration may be varied as desired, but it is desirable for my purpose to use as little as will accomplish my object. The ammonia serves to solubilize the protein and also appears to assist in the initial wetting of the resinate. The amount of protein can be varied from 3 percent to 10 percent, or more, of the weight of water employed, but for reasons of economy, it is desirable to use the smallest practicable amount, which will usually be 3 or 4 percent.

The second step in making my composition is the initial wetting of the resinate. This is most easily done by stirring the dry resinate into a small volume of the proteinate solution. The amount of liquid initially used will vary with the amount of resinate, but should not be large enough to dampen all of the resinate. Once a wetted nucleus is formed, additional liquid can be easily added. Ordinarily, approximately 3 grams of resinate can be initially blended into the mixture for every 4 grams of proteinate solution. These proportions form a pasty mass, which gives the appearance of being uniformly wetted, but which actually contains much of the resinate in the form of small dry particles. The pasty mass is next violently agitated in such a manner as to break up these small particles, whereupon the mass is transformed into a thin liquid, and more of the dry resinate is then blended into the mass until the total weight of resinate present is approximately 97 per cent of the weight of water employed in preparing the proteinate solution.

The third and final step consists of blending into the mass an aqueous suspension of hydrated lime, or magnesia. The amount to be added can be varied, but must be at least chemically equivalent to the ammonia employed in making the proteinate solution, and should not exceed twice the chemical equivalent of the ammonia.

My composition now assumes its thixotropic character and its physical state is greatly affected by small changes in composition. The addition of even one or two percent additional resinate will cause a marked change in the consistency of the mass as will also addition of small volumes of ammonium proteinate solution. The changes occurring are out of all proportion to a mere thickening action, such as that caused by adding a finely divided inert powder to water, and I can offer no explanation for it, or for the thixotropic property.

A specific example of the carrying out of my invention is as follows: 2½ cc. of 28 percent ammonia is added to 100 cc. of water, and 4 grams of protein is dispersed in the ammoniacal solution, preferably by warming; 75 grams of resinate is next wetted with 10 or 20 cc. of this solution and the remainder of the liquid is then gradually added; the pasty mass is then put into a suitable mixing device and the small particles broken up; next, 22 grams of resinate is blended in; finally, 3 grams of calcium oxide slaked with 10 cc. of water is incorporated, whereupon the composition assumes its plastic thixotropic state.

Having thus described my invention, what I claim for Letters Patent is:

1. A thixotropic composition of matter, comprising an aqueous dispersion of water-insoluble metallic resinate, calcium proteinate, and a trace of lime.

2. A thixotropic composition of matter, comprising a dispersion of water-insoluble metallic resinate in a substantially equal amount of dilute aqueous ammonium proteinate by weight, having calcium proteinate dispersed therein, said calcium proteinate having been obtained as a final step by reaction between calcium proteinate and a trace of hydrated lime.

MARTIN LEATHERMAN.